3,222,346
POLYMERIZATION OF ISOPRENE
Herbert R. Appell, Pitcairn, Pa., and Herman S. Bloch, Skokie, Ill., assignors to Universal Oil Products Company, Des Plaines, Ill., a corporation of Delaware
No Drawing. Filed Jan. 10, 1962, Ser. No. 165,306
5 Claims. (Cl. 260—94.2)

This application is a continuation-in-part of our copending application Serial No. 850,530 filed November 3, 1959, now abandoned, which was a continuation-in-part of our copending application Serial No. 768,088 filed October 20, 1958, now abandoned.

This invention relates to a process for the polymerization of unsaturated organic compounds and particularly to a process for polymerizing unsymmetrical conjugated diolefinic hydrocarbons. More particularly the invention is concerned with a process for stereoselectively polymerizing isoprene in the presence of certain alkali metal supported catalysts whereby a desired polymer of isoprene is obtained thereby.

The need for crude rubber, either natural or synthetic has increased at a tremendous rate inasmuch as it has obtained a position of great importance as a material of modern manufacture, said importance being due to the diverse uses to which it may be put. Heretofore in past years the amount of natural rubber which may be obtained naturally from rubber trees has been sufficient to satisfy the requirements of modern living. However, the sources of natural rubber may be made unattainable to many countries due to emergencies which may arise. This condition was made apparent during the last war when many sources of natural rubber in the Far East, such as Southeast Asia, were cut off from the Western Hemisphere. When situations such as this arise, substitutes must be found to take the place of natural rubber. Heretofore, synthetic rubbers such as the types produced by the reaction of butadiene and styrene (GR–S), butadiene and acrylonitrile (Buna-N), butadiene and isobutylene, Thiokol rubber, silicone rubber, neoprene rubber, etc., have been prepared. However, these products have usually been inferior to natural rubber in many of the necessary properties when in the vulcanized elastic state. It has now been discovered that a diolefinic hydrocarbon such as isoprene may be caused to polymerize stereoselectively to a rubbery product similar in many properties to the natural Hevea type rubber by effecting the polymerization in a continuous manner in the presence of a catalyst comprising an active alkali metal such as sodium or potassium supported on a precalcined, high surface area, solid support.

It is therefore an object of this invention to provide a process for preparing a synthetic rubber similar in properties to natural rubber.

A further object of this invention is to stereoselectively polymerize an unsaturated organic hydrocarbon such as isoprene in the presence of certain catalysts of the type hereinafter more fully set forth to prepare a desired specific polymer which is similar to a natural type rubber.

Taken in its broadest aspect one embodiment of this invention resides in a process for the stereoselective polymerization of an unsymmetrical conjugated diolefinic hydrocarbon which comprises polymerizing said hydrocarbon at polymerization conditions in the presence of an alkali metal selected from the group consisting of sodium and potassium disposed on a precalcined solid support having a surface area of from about 25 to about 500 square meters per gram to form a polymer containing a predominant proportion of the 3,4-polymer.

A specific embodiment of this invention resides in a process for the stereoselective polymerization of isoprene which comprises polymerizing isoprene at a temperature in the range of from about 0° to about 100° C., and at a pressure in the range of from about atmospheric to about 100 atmospheres in the presence of sodium disposed on a precalcined alumina support having a surface area of from about 25 to about 500 square meters per gram to form a polymer containing a predominant proportion of the 3,4-polymer.

Other objects and embodiments will be found in the following further detailed description of this invention.

As hereinbefore set forth it has now been discovered that a synthetic rubber comparable to the natural Hevea type rubber may be prepared by stereoselectively polymerizing an unsaturated organic compound, and particularly a conjugated diolefinic hydrocarbon such as isoprene in the presence of certain alkali metal catalysts which are supported on a precalcined high surface area support to form specific desired polymers thereof.

The uses of rubber in articles of manufacture are many and varied, being too numerous to list in their entirety. A few uses are, for example, raw rubber which may be used in the shoe industry for the production of crepe soles for shoes, for erasers, adhesive cements and in the fabrication of gummed fabrics, such as, for example, rubber cloaks, etc.; vulcanized rubber products which will include bumpers, buffers, vehicle tires, shock- and sound-proof articles, rubber bands, stoppers, stamps, sponges, elastic thread, belts, packing materials for machine construction, insulation, etc.; and hard rubber which may be used as a suitable material for combs, tubing, fountain pens, dental goods, etc.

As hereinbefore set forth, the polymerization process of the present invention is effected in the presence of certain active alkali metals disposed on a solid support. The alkali metals which are utilizable in the present process comprise sodium and potassium, these metals being necessary to prepare the particular type of polymer which is the desired product. The aforesaid polymer which is a desired product of the present invention will be referred to hereinafter in the specification and appended claims as a 3,4-polymer. This type of polymer is the product of a polymerization reaction in which only one double bond of the conjugated diolefin is involved, and has predominantly the structure:

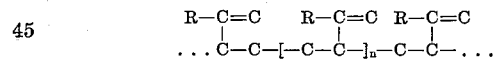

in which $n$ is at least 30, and R is hydrogen or an alkyl radical (depending on the monomer), this polymer being distinguished from a 1,4-polymer in which both double bonds are involved. The 1,4-polymer is found in natural rubber as well as certain forms of Hevea type rubber prepared synthetically by the polymerization of unsaturated organic compounds, the reaction being catalyzed by other metals such as, for example, lithium. Therefore, by the utilization of a relatively reactive metal catalyst such as sodium or potassium disposed on an adsorptive support and lower reaction temperatures the polymerization reaction will result in the formation of a 3,4-polymer, while the use of a relatively less reactive metal catalyst such as lithium and higher temperatures will influence the type of polymer which is obtained from the reaction, the latter reaction usually resulting in a polymer of the 1,4-type.

As hereinbefore set forth the prior art has disclosed polymerization of unsaturated organic compounds and particularly diolefinic hydrocarbons in the presence of certain catalytic compositions of matter. For example, 1,3-butadiene has been polymerized in the presence of sodium or potassium metal without a solid support, or even on a non-porous, low surface-area support such as glasswool. However, these polymers show largely a 1,2- addition while the use of potassium or sodium per se when utilized in polymerizing isoprene gave a cis-1,4-polyisoprenes. Likewise the use of an Alfin catalyst (such as the complex formed between sodium isopropoxide and allylsodium), to polymerize conjugated diolefinic hydrocarbons such as isoprene yields a greater proportion of trans-1,4-polymers than any other polymer present. As hereinbefore set forth in the preceding paragraph it has likewise been found that the use of lithium as a catalyst in the polymerization of diolefinic hydrocarbons will produce a polymer with the highest percent of cis-1,4-structure in the polyisoprene series with the lowest percentage of 3,4-addition. This is likewise true when an organo lithium compound such as a methyllithium, ethyllithium, propyllithium, etc., is used as a catalylst.

In contradistinction to the catalysts utilized in the prior art which, when utilized to polymerize a diolefinic hydrocarbon such as isoprene will result in the obtention of polymers of 1,2- or 1,4-configuration, the use of a catalyst comprising an alkali metal such as sodium or potassium disposed on a precalcined, highly adsorptive, high surface area support, said surface area being in a range of from about 25 to about 500 square meters per gram, will result a polymer having a 3,4-configuration, which configuration is the desired product.

The preferred unsaturated organic compound and particularly the unsymmetrical conjugated diolefinic hydrocarbon which is used in the process of the invention comprises isoprene (2-methyl-1,3-butadiene) which according to the nomenclature most popularly used has the following formula:

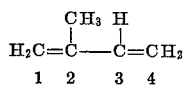

Therefore, the product obtained by the polymerization of isoprene in the presence of sodium or potassium disposed on a high surface area solid support will involve reaction of only the vinyl double bond, i.e., the 3,4-double bond in the above set forth formula, which is not connected to a carbon atom having the methyl substituent, yielding essentially polyisopropenylethylene. It is also contemplated within the scope of this invention that other unsymmetrical conjugated diolefinic hydrocarbons (particularly those having not more than seven carbon atoms), such as 1,3-pentadiene, 2-methyl-1,3-pentadiene, 2,3-dimethyl-1,3-pentadiene, 2-ethyl-1,3-butadiene, etc., may also be polymerized according to the process of this invention and utilizing the catalyst described herein, although not necessarily with equivalent results.

The sodium or potassium metal is disposed on a highly adsorptive solid support, the term "solid support" meaning certain high surface area metal oxides, charcoal, etc., in a quantity ranging from about 2 to about 20% by weight based on the solid support. However, not every adsorptive solid support can be utilized as a satisfactory one for disposal of an alkali metal thereon. As is well known to one experienced in the art, the alkali metals such as sodium and potassium react relatively violently with water and thus care must be taken to utilize those supports which are relatively or substantially free from water. In most cases, this freedom from water of the support is achieved by a precalcination treatment of said support. This precalcination is carried out at a relatively high temperature in the range of from about 400° to about 700° C. and for a time sufficient to effect substantial removal of adsorbed or combined water from the support. The time required will vary depending upon whether the water is in a combined or in merely a physically adsorbed form. In addition to the necessity for freedom from water, the support is characterized by the necessity for having a high surface area. By the term high surface area is meant a surface area, as measured by standard surface adsorption techniques, within the range of from about 25 to about 500 or more square meters per gram. For example, it has been found that certain low surface area supports such as alpha-alumina which is obviously free from combined water and which has been freed from adsorbed water is not a satisfactory support for the alkali metals in the preparation of catalysts for use in the process of this invention. Alpha-alumina is usually characterized by a surface area ranging from about 10 to about 25 square meters per gram. In contrast, gamma-alumina which usually has a surface area ranging from about 100 to about 300 square meters per gram, and which has been freed from adsorbed water and which contains little combined water, is a satisfactory support. Celite, a naturally occurring mineral, after precalcination, is not a satisfactory support. Celite has a surface area of from about 2 to about 10 square meters per gram. Likewise alkali metal dispersions on sand or on other low surface area silica are not satisfactory catalysts in this process. In addition, aluminas which contain combined water but which have relatively high surface areas are also not satisfactory supports. Such aluminas include dried alumina mono-hydrates which have not been sufficiently calcined to remove combined water and to form gamma-alumina. These alumina hydrates may have surface areas ranging from about 50 to about 200 square meters per gram but because they contain combined water are not satisfactory supports. Particularly preferred supports for the preparation of catalysts for use in the process of this invention include high surface area crystalline alumina modifications such as gamma-, eta- and theta-alumina, high surface area silica, charcoals, magnesia, silica-alumina, silica-alumina-magnesia, etc., although these are not necessarily of equivalent suitability. However, as is obvious from the above discussion the limitation on the use of any particular support is one of freedom from combined or adsorbed water in combination with the surface area of the support selected.

The sodium or potassium may be disposed on a support in any manner. One manner which has been found suitable is vaporization of the alkali metal and the passage of the vapors over the support. In this manner of preparation care must be taken to utilize relatively low temperatures since heat is given off on contact of the alkali metal with the support and since high temperatures tend to destroy the amount of surface in the support, and may also cause certain chemical reactions of the support with the alkali metal which are detrimental to catalyst activity. Sodium melts at about 97° C. and in impregnating a selected support with sodium it is preferred to carry out the impregnation or disposal of the sodium thereon at temperatures in the order of from about 100° to about 200° C. This can be accomplished for example, by melting sodium and by dropping the sodium on the support or by the passage of a stream of inert gas such as nitrogen or argon through the molten sodium and over a bed of the selected support disposed in a separate zone maintained at the desired temperature with cooling or heating means connected therewith. Potassium melts at about 62° C. and thus the impregnation of a selected support with potassium can be carried out at even lower temperatures. Potassium disposed on one of the above mentioned supports appears to be a more active catalyst for the reactions disclosed herein than does sodium and this difference in activity may be due to the lower temperatures which can be used in the disposal of potassium on the support.

Furthermore, disposal of the selected alkali metal on the support must be carried out in a manner so that the high surface of the support in combination with the alkali metal is not destroyed by incorporation of excess quantities of the alkali metal therein. In other words, the pores and passage ways of the support can be filled and blocked by addition of excess quantities of alkali metal. This is obviously undesirable and supported alkali metals containing excess alkali metal are relatively inactive in this process. It is contemplated within the scope of this invention that the sodium disposed on a precalcined high surface support or the potassium disposed on a precalcined high surface area support may be treated with hydrogen to form the corresponding sodium hydride or potassium hydride, said hydrides being effective as catalysts to give stereoselective polymerization of the diolefinic hydrocarbons thereby forming 3,4-polymers.

The process of this invention may take place at temperatures ranging from about 0° to about 100° C. or more. Generally speaking the pressure at which this process operates will be dependent upon the particular unsymmetrical conjugated diolefinic hydrocarbon undergoing polymerization and the particular catalyst which is used in said process and need only be sufficient to maintain a substantial portion of the reactants in the liquid phase, said pressure being in the range of from about atmospheric to about 100 atmospheres or more. It is to be understood that as in the case of the pressures, the temperatures will also be dependent upon the particular diolefin undergoing polymerization.

The process of this invention may be effected in any suitable manner and may comprise either a batch or a continuous type operation. When a batch type operation is used a quantity of the unsaturated organic compound such as isoprene is placed in an appropriate apparatus such as a stirrer-equipped glass flask or, if higher temperatures and pressures are to be used, in a rotating autoclave. The particular apparatus which has been selected will contain the polymerization catalyst comprising the sodium or potassium disposed on a precalcined high surface area solid support. If so desired, an inert organic diluent may also be used, said diluent including cyclic hydrocarbons such as benzene, naphthalene, cyclopentane, methylcyclopentane, ethylcyclopentane, methylcylohexane, etc.; paraffinic hydrocarbons such as n-pentane, n-hexane, n-heptane, etc.; ethers such as dimethyl ether, diethyl ether, dipropyl ether, dioxane, etc. The apparatus and contents thereof are then cooled or heated to the desired reaction temperature and maintained thereat for a predetermined period of time. At the end of this time the product comprising a rubber type compound consisting predominantly of a 3,4-polymer is separated from the catalyst and recovered by conventional means.

The process of this invention may also be effected in a continuous type operation, the catalyst comprising sodium or potassium disposed on a precalcined high surface area support being particularly suitable for use in a fixed bed type of operation. In this type of operation the catalyst is disposed as a fixed bed in a reaction zone which may comprise either an unpacked vessel or coil or which may be lined with an adsorbent packing material such as dehydrated bauxite, fire brick, alumina and the like. The reaction zone is maintained at the proper operating conditions of temperature and pressure while the diolefinic hydrocarbon and the solvent, if one is desired, are continuously charged thereto through separate lines. Alternatively, the diolefinic hydrocarbon and the organic solvent or diluent may be admixed prior to entry into said reactor and charged thereto in a single stream. In carrying out the process of this invention in a continuous manner liquid hourly space velocities (the volume of liquid hydrocarbon charged to the reactor per volume of catalyst per hour) may be varied within a relatively wide range of from about 0.1 to about 20 or more, the preferred range being from about 0.1 to about 10. The desired reaction product is continuously withdrawn from the reaction zone, separated from the reactor effluent and purified by conventional means, while said remaining effluent may be recharged at least in part to the reaction zone as a portion of the feed material.

Other continuous types of operation which may be used in this process include the compact moving bed type of operation in which the bed of catalyst and the reactants pass either concurrently or countercurrently to each other in the reaction zone, and the slurry type process in which the catalyst is carried into the reaction zone as a slurry in one of the reactants.

The following examples are given to illustrate the process of the present invention, which, however, are not intended to limit the generally broad scope of the present invention in strict accordance therewith.

*Example I*

A catalyst was prepared by adding sodium, in a nitrogen atmosphere, to a stirred mass of alumina which had been freshly calcined at 650° C., the temperature during the addition being maintained between 150° and 170° C.

A stream of dry nitrogen was passed through a 500 ml. three-necked alkylation flask while 50 cc. of the polymerization catalyst prepared in the above manner, containing 16.6% sodium disposed on an alumina support, and 250 cc. of freshly distilled, dry benzene were being added. 100 cc. of freshly distilled isoprene was added to the flask during a period of about 5 minutes. The isoprene polymerized slowly at the start but after a period of about 2 hours a small increase in viscosity was noticed. The flask was allowed to stand at room temperature (25° C.) for a period of about 20 hours, at the end of which time the catalyst particles had become coated with a layer of translucent polymer. The rubber type polymer was collected by pouring the benzene solution into ethyl alcohol, said polymer separating out as a rubbery pale yellow mass. Measurement of the degree of polymerization and infrared analysis of the polymerized product indicated that isoprene had polymerized stereoselectively by 3,4-addition to form a crepe-rubber like product having primarily the structure:

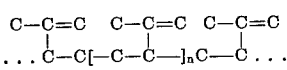

in which $n$ is at least 30 and may reach as high as 100,000 or more.

*Example II*

Fifty cc. of a polymerization catalyst comprising 16.6% sodium disposed on a solid alumina support was placed in the glass liner of a rotating autoclave along with 250 cc. of benzene. The liner was flushed with nitrogen and sealed into the autoclave after 100 cc. of butadiene had been added. The autoclave was heated to a temperature of about 70° C. and maintained thereat for a period of about 5 hours under self-generated pressure. At the end of this time the autoclave and contents thereof were cooled to room temperature and the rubbery polymerized butadiene was recovered from the benzene solvent. Infra-red examination of the rubber showed that it contained the following proportions of olefinic species:

R—HC=CH$_2$ (by 3,4-polymerization)—60%;
RHC=CHR' (by 1,4 polymerization)—30% (half cis and half trans);
RR'C=CHR"—5%.
Unidentified polymer—5%

It is, therefore, readily apparent from the above examples that the use of a catalyst of the type hereinbefore set forth, namely, an alkali metal such as sodium or potassium disposed on a highly porous precalcined high surface area support, when utilized to polymerize an unsymmetrical, conjugated diolefinic hydrocarbon such as isoprene will result in the obtention of a greater yield of specific desired polymers having a 3,4-configuration in contradistinction to polymerizations disclosed in the prior art which use other catalysts such as alkali metals per se or alkali metals disposed on non-porous, low surface area supports wherein the resultant product consists of mainly of polymers possessing 1,2-- or 1,4-configurations.

We claim as our invention:

1. A process for the stereoselective polymerization of an unsymmetrical conjugated diolefinic hydrocarbon which comprises polymerizing said hydrocarbon at a temperature in the range of from about 0° C. to about 100° C. and at a pressure in the range of from about atmospheric to about 100 atmospheres in the presence of an alkali metal selected from the group consisting of sodium and potassium disposed on a precalcined adsorptive solid support having a surface area of from about 25 to about 500 square meters per gram to form a polymer containing a predominant proportion of the 3,4-polymer.

2. A process for the stereoselective polymerization of isoprene which comprises polymerizing isoprene at a temperature in the range of from about 0° C. to about 100° C. and at a pressure in the range of from about atmospheric to about 100 atmospheres in the presence of an alkali metal selected from the group consisting of sodium and potassium disposed on a precalcined adsorptive solid support having a surface area of from about 25 to about 500 square meters per gram to form a polymer containing a predominant proportion of the 3,4-polymer.

3. A process for the stereoselective polymerization of isoprene which comprises polymerizing isoprene at a temperature in the range of from about 0° to about 100° C. and at a pressure in the range of from about atmospheric to about 100 atmospheres in the presence of an alkali metal selected from the group consisting of sodium and potassium disposed on a precalcined adsorptive alumina support having a surface area of from about 25 to about 500 square meters per gram to form a polymer containing a predominant proportion of the 3,4-polymer.

4. A process for the stereoselective polymerization of isoprene which comprises polymerizing isoprene at a temperature in the range of from about 0° to about 100° C. and at a pressure in the range of from about atmospheric to about 100 atmospheres in the presence of sodium disposed on a precalcined adsorptive alumina support having a surface area of from about 25 to about 500 square meters per gram to form a polymer containing a predominant proportion of the 3,4-polymer.

5. A process for the stereoselective polymerization of isoprene which comprises polymerizing isoprene at a temperature in the range of from about 0° C. to about 100° C. and a pressure in the range of from about atmospheric to about 100 atmospheres in the presence of potassium disposed on a precalcined adsorptive alumina support having a surface area of from about 25 to about 500 square meters per gram to form a polymer containing a predominant proportion of the 3,4-polymer.

References Cited by the Examiner
UNITED STATES PATENTS

| | | | |
|---|---|---|---|
| 2,456,525 | 12/1948 | Mills | 260—94.2 |
| 2,829,136 | 4/1958 | Fotis, et al. | 260—94.9 |
| 2,994,727 | 8/1961 | Appell et al. | 252—476 |

OTHER REFERENCES

Schildknecht, C. E., Polymer Processes, pp. 226–230, vol. X of High Polymers, Interscience Publishers, Inc., New York, 1956.

JOSEPH L. SCHOFER, *Primary Examiner.*

LEON J. BERCOVITZ, *Examiner.*